(12) United States Patent
Atsumi et al.

(10) Patent No.: US 10,114,118 B2
(45) Date of Patent: Oct. 30, 2018

(54) RADAR DEVICE

(71) Applicant: FURUNO ELECTRIC CO., LTD., Nishinomiya, Hyogo (JP)

(72) Inventors: Koji Atsumi, Takarazuka (JP); Tatsunori Tanaka, Nishinomiya (JP)

(73) Assignee: FURUNO ELECTRIC COMPANY LIMITED, Nishinomiya (JP)

( * ) Notice: Subject to any disclaimer, the term of this patent is extended or adjusted under 35 U.S.C. 154(b) by 367 days.

(21) Appl. No.: 15/070,397

(22) Filed: Mar. 15, 2016

(65) Prior Publication Data

US 2016/0274217 A1 Sep. 22, 2016

(30) Foreign Application Priority Data

Mar. 17, 2015 (JP) ................................. 2015-052780

(51) Int. Cl.
| | |
|---|---|
| *G01S 13/93* | (2006.01) |
| *G01S 7/03* | (2006.01) |
| *G01S 7/02* | (2006.01) |
| *H01Q 1/22* | (2006.01) |

(52) U.S. Cl.
CPC .......... *G01S 13/9307* (2013.01); *G01S 7/034* (2013.01); *G01S 7/032* (2013.01); *G01S 2007/027* (2013.01); *H01Q 1/22* (2013.01)

(58) Field of Classification Search
CPC .. G01S 2007/027; G01S 13/931; G01S 7/032; G01S 13/888; G01S 13/88; G01S 2013/0254; G01S 7/4813; G01S 7/03; G01S 13/953; G01S 2013/0245; G01S 1/3233; H01Q 1/42; H01Q 1/3233; H01Q 1/40; H01Q 1/22; Y02A 90/18
See application file for complete search history.

(56) References Cited

U.S. PATENT DOCUMENTS

| | | | | |
|---|---|---|---|---|
| 5,774,091 | A  * | 6/1998 | McEwan  | G01C 3/08 342/126 |
| 9,897,695 | B2 * | 2/2018 | Vacanti | G01S 13/0209 |
| 2006/0152406 | A1* | 7/2006 | Leblanc | G01S 7/032 342/175 |
| 2016/0197399 | A1* | 7/2016 | Davy | H01Q 3/04 342/175 |
| 2017/0104276 | A1* | 4/2017 | Vacanti | H01Q 21/20 |

FOREIGN PATENT DOCUMENTS

JP  2014-106001 A  6/2014

* cited by examiner

*Primary Examiner* — Olumide Ajibade Akonai
(74) *Attorney, Agent, or Firm* — Studebaker & Brackett PC (57) ABSTRACT

A radar device 1 equipped with a radar antenna 2. Specifically, this radar device 1 comprises a housing 3, a transmitting unit 6, and a receiving unit 7. The housing 3 has a first wall component 3R and a second wall component 3L that are opposite each other. The transmitting unit 6 is attached on the first wall component 3R side in an internal space of the housing 3, and is configured to transmit radar signal through the radar antenna 2. The receiving unit 7 is attached on the second wall component 3L side in the internal space of the housing, is disposed opposite the transmitting unit 6, and is configured to receive reflected wave of the radar signal through the radar antenna 2.

16 Claims, 4 Drawing Sheets

RADAR DEVICE

CROSS-REFERENCE TO RELATED APPLICATIONS

This application claims priority to Japanese Patent Application No. 2015-052780 filed on Mar. 17, 2015. The entire disclosure of Japanese Patent Application No. 2015-052780 is hereby incorporated herein by reference.

BACKGROUND

Field of the Invention

The present invention relates to a radar device equipped with a radar antenna. More specifically, the present invention relates to a configuration for improving heat dissipation in a housing that holds parts for controlling a radar antenna, etc.

Background Information

Radar devices equipped with a radar antenna have been conventionally known. Japanese Laid-Open Patent Application Publication No. 2014-106001 (Patent Literature 1) discloses this type of radar device. The housing of the radar device in Patent Literature 1 holds a magnetron (corresponds to part of a transmitting unit) that is a source of heat, as well as a heating element on a first circuit board, etc. To improve heat dissipation from these heat sources, the configuration is such that a cooling fan is disposed beneath the magnetron for cooling this magnetron, and a ventiduct through which air can flow is disposed near the heating element.

SUMMARY

With the configuration in the above-mentioned Patent Literature 1, however, even though air flows through the ventiduct and the air inside the housing is circulated by the cooling fan, heat generated from the heat sources in the housing still tends to accumulate in the housing, and there were situations in which adequate heat dissipation could not be obtained. Also, when a ventiduct is provided, some kind of waterproofing becomes necessary, which makes the structure inside the housing more complicated and drives up the manufacturing cost. Furthermore, when a cooling fan is provided, it has to be replaced periodically, which makes maintenance work more difficult. Thus, the configuration in the above-mentioned Patent Literature 1 had room for improvement in these respects.

The present invention is conceived in light of the above situation, and a main object thereof is to improve heat dissipation in a radar device with a simple configuration.

The problem the present invention is intended to solve is as discussed above, and the means for solving this problem, and the effect of these means, will now be described.

An aspect of the present invention provides the following configuration in a radar device equipped with a radar antenna. Specifically, this radar device comprises a housing, a transmitting unit, and a receiving unit. The housing has a first wall component and a second wall component that are opposite each other. The transmitting unit is attached on the first wall component side in an internal space of the housing, and is configured to transmit radar signal through the radar antenna. The receiving unit is attached on the second wall component side in the internal space of the housing, is disposed opposite the transmitting unit, and is configured to receive reflected wave of the radar signal through the radar antenna.

Because the transmitting unit and the receiving unit, which generate heat, are thus disposed on either side of a pair of wall components had by the housing, any heat generated by the transmitting unit or the receiving unit is more easily released to the outside of the housing. This allows parts that are susceptible to heat within the housing to be protected with a simple configuration.

The above radar device is preferably configured as follows. Specifically, the radar device further comprises a transmitting and receiving switch and a waveguide that are disposed between the transmitting unit and the receiving unit. The transmitting and receiving switch is configured to selectively connect either the transmitting unit or the receiving unit to the radar antenna. The waveguide is configured to transmit radio wave between the radar antenna and either the transmitting unit or the receiving unit.

Consequently, the transmitting unit, the receiving unit, the transmitting and receiving switch, and the waveguide can be laid out rationally, affording a more compact radar device configuration.

The above radar device is preferably configured as follows. Specifically, the housing further has a third wall component that is disposed in an orientation that is different from that of the first wall component and the second wall component. A power supply unit is disposed on the third wall component side in the internal space of the housing.

Since the power supply unit, which generates heat, is thus disposed on the side of a different wall component from the wall component where the transmitting unit and the receiving unit are disposed out of the wall components of the housing, heat generated by the power supply unit is more easily released to outside the housing, and heat dissipation is further enhanced.

With the above radar device, the third wall component is preferably a wall component on a bottom of the housing.

Since the power supply unit, which is one of the heavier parts that make up the radar device is thus disposed on the bottom face side of the housing, the center of gravity of the radar device as a whole can be lowered, which allows the balance to be stabilized.

The above radar device is preferably configured as follows. Specifically, this radar device further comprises a rail and a frame. The rail extends perpendicular to a direction in which the first wall component and the second wall component are opposite each other. The frame is slidable along the rail. The transmitting unit, the receiving unit, and a part disposed between the transmitting unit and the receiving unit are supported by the frame, and are extractable through an opening formed in the housing by sliding along the rail integrally with the frame.

Consequently, by sliding along the rail and extracting at least a portion to outside the housing, the transmitting unit and receiving unit supported on the frame, as well as at least some of the parts disposed between the transmitting unit and receiving unit can be greatly exposed on the outside of the housing. This makes maintenance much easier.

With the above radar device, it is preferable if at least part of the transmitting unit is removable from the frame in a state in which the part of the transmitting unit is extracted outside the housing after sliding along the rail integrally with the frame.

This facilitates the job of removing at least part of the transmitting unit (such as a portion that has particularly need for maintenance), so far fewer work steps will be entailed by maintenance.

The above radar device is preferably configured as follows. Specifically, the radar device further comprises a heat dissipation member attached to at least one of the transmitting unit and the receiving unit. The heat dissipation member is disposed at an end portion of the transmitting unit or the receiving unit on a side closer to the opening.

Consequently, during maintenance of the transmitting unit, etc., it will be easier to replace a deteriorated heat dissipation member with a new one, and maintenance can be carried out more efficiently.

The above radar device is preferably configured as follows. Specifically, the receiving unit includes a receiving board and a signal processing board. The receiving board is disposed along one of the first wall component and the second wall component of the housing. The signal processing board is disposed parallel to the receiving board.

Consequently, since the receiving board and the signal processing board are disposed parallel to each other along one of the wall components of the housing, there will tend to be less dead space, and the space inside the housing can be utilized more effectively.

BRIEF DESCRIPTION OF THE DRAWINGS

Referring now to the attached drawings which form a part of this original disclosure.

DETAILED DESCRIPTION OF EMBODIMENTS

Figure 1:
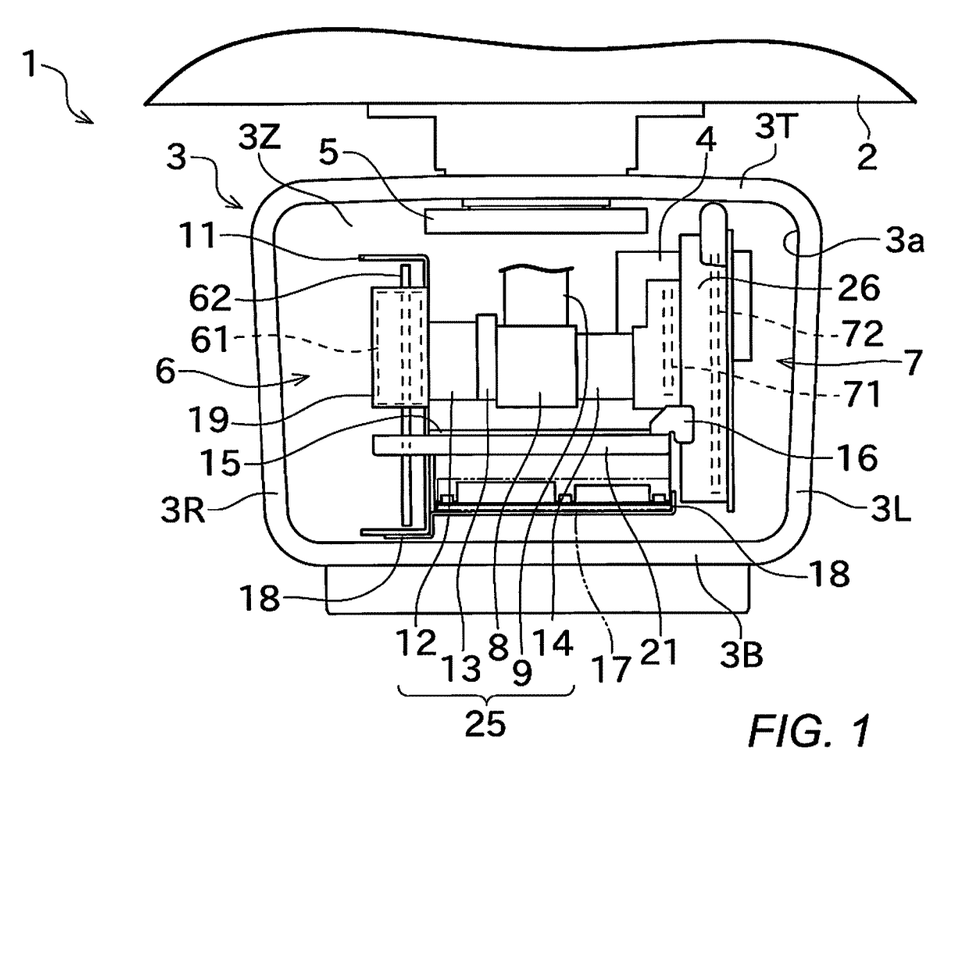
FIG. 1 is a front view of the part layout inside the housing of the radar device pertaining to an embodiment of the present invention.
Figure 2:
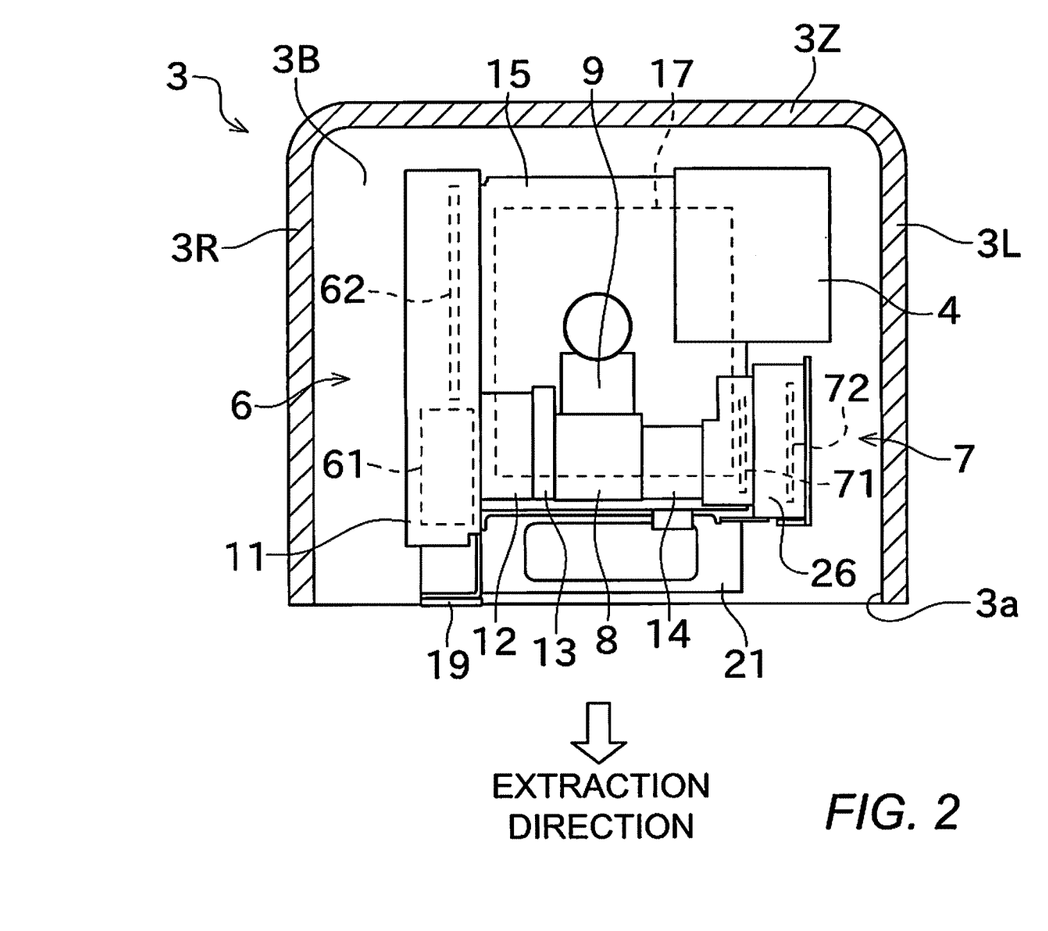
FIG. 2 is a cross sectional plan view of the part layout inside the housing.
Figure 3:
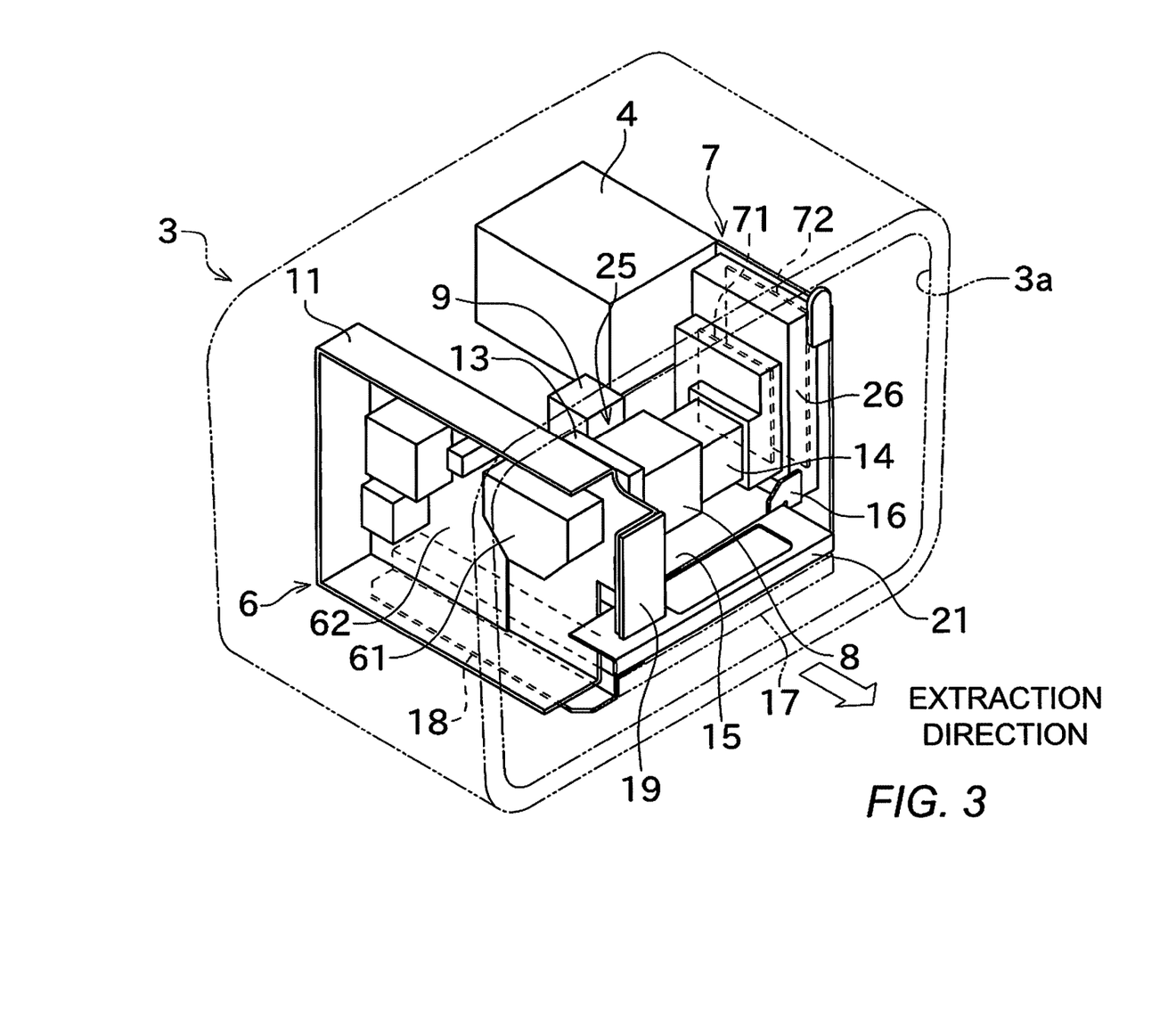
FIG. 3 is an oblique view of the part layout inside the housing.

A selected embodiment will now be explained with reference to the drawings. It will be apparent to those skilled in the art from this disclosure that the following descriptions of the embodiments are provided for illustration only and not for the purpose of limiting the invention as defined by the appended claims and their equivalents. FIG. 1 is a front view of the part layout inside a housing 3 of a radar device 1 pertaining to an embodiment of the present invention. FIG. 2 is a cross sectional plan view of the part layout inside the housing 3. FIG. 3 is an oblique view of the part layout inside the housing 3.

The radar device 1 shown in FIG. 1 is configured as a marine radar installed on a boat or ship. The radar device 1 includes a radar antenna or radar antenna main body 2 and a housing 3. The radar device 1 is connected to a display device (not shown), and a radar image showing the result of scanning the area around the ship can be displayed on the display device.

The radar antenna 2 is a radiation conductor, and is configured as a slot array antenna having sharp directionality. The radar device 1 in this embodiment is configured as a pulse radar, in which the radar antenna 2 is rotationally driven at a constant speed while transmission and reception of high-frequency signals are repeated by the radar antenna 2.

The housing 3 shown in FIG. 1 is formed in a hollow shape, and can hold various kinds of parts for controlling the radar antenna 2. On the front side of the radar device 1 (the side that is in front in FIG. 1), a large opening 3a is formed in the housing 3, and this opening 3a can be closed off by a cover attached to the housing 3. This cover is not depicted in the drawings, however, in order to make the interior of the housing 3 easier to see.

The housing 3 includes a pair of wall components (a left wall component 3L and a right wall component 3R) that are opposite each other and separated in the left and right direction of the device, a pair of wall components (a top wall component 3T and a bottom wall component 3B) that are opposite each other and separated in the up and down direction, and a wall component (a rear wall component 3Z) that is opposite the cover. These wall component are all in the form of flat panels, and separate the interior of the housing 3 from the exterior.

The left wall component 3L and the right wall component 3R are disposed with their thickness direction facing the left and right direction of the device. The top wall component 3T and the bottom wall component 3B are disposed with their thickness direction facing the up and down direction of the device. The rear wall component 3Z is with its thickness direction facing the fore and aft direction of the device.

The left wall component 3L and the right wall component 3R are connected to each other by the top wall component 3T, the bottom wall component 3B, and the rear wall component 3Z. The top wall component 3T and the bottom wall component 3B are connected to each other by the left wall component 3L, the right wall component 3R, and the rear wall component 3Z.

A through-hole is formed in the top wall component 3T, and the rotational drive shaft of the radar antenna 2 is inserted through this hole. The housing 3 holds a drive motor 4 and a gear 5 for driving this rotational drive shaft. In addition, a transmitting unit 6, a receiving unit 7, a circulator (transmitting and receiving switch) 8, a waveguide 9, and so forth are disposed inside the housing 3.

The transmitting unit 6 is made of a number of parts, assembled as a single module, for transmitting radar signals through the radar antenna 2. As shown in FIGS. 1 to 3, the transmitting unit 6 is made up of a magnetron 61 that generates high-frequency signals, and a magnetron drive circuit board 62 on which is mounted a magnetron drive circuit for driving the magnetron 61. As shown in FIG. 3, etc., the magnetron 61 and the magnetron drive circuit board 62 are housed in a cuboid space formed by a transmitting unit frame 11 made of sheet metal, and this constitutes a single unit formed in a substantially flat shape that is rather thick. The transmitting unit 6 is disposed such that it is erected perpendicular on one wall component (the right wall component 3R) side, out of the left wall component 3L and the right wall component 3R that are disposed opposite each other on the left and right. The transmitting unit 6 is thus disposed closer to the right wall component 3R adjacent to the right wall component 3R. In the transmitting unit 6, the magnetron 61 is disposed on the side closer to the opening 3a of the housing 3.

The receiving unit 7 is made of a number of parts, assembled as a single module, for receiving reflected waves of radar signals through the radar antenna 2. The receiving unit 7 is made up of a receiving board 71 and a signal processing board 72. A receiving circuit for receiving reflected waves of radar signals from the outside through the radar antenna 2 is mounted on the receiving board 71. A signal processing circuit that outputs radar image data to be displayed on the display device by performing specific signal processing on the reflected waves of radar signals received by the receiving board 71 is mounted on the signal processing board 72. Of the left wall component 3L and the right wall component 3R that are disposed opposite each other on the left and right, the receiving board 71 is disposed along the wall component (the left wall component 3L) that is on the opposite side from the side where the transmitting unit 6 is disposed. The signal processing board 72 is disposed parallel to the receiving board 71.

The receiving board 71 and the signal processing board 72 are housed in the space formed by a receiving unit frame 26 that is made of sheet metal, and are configured as a single unit formed in a substantially flat shape that is rather thick. The receiving unit 7 is disposed such that it is erected perpendicular on the left wall component 3L side. The receiving unit 7 is thus disposed closer to the left wall component 3L adjacent to the left wall component 3L. Also, since the receiving board 71 and the signal processing board 72 are disposed parallel to each other along the left wall component 3L, the receiving unit 7 can be disposed in a small space, so it is less likely that there will be any dead space.

The circulator 8 selectively connects either the transmitting unit 6 or the receiving unit 7 to the radar antenna 2. More specifically, the circulator 8 allows the signal path to be switched as desired so that high-frequency signals in the form of high-energy pulses will not be inputted from the transmitting unit 6 to the receiving unit 7, or so that reception signals received by the radar antenna 2 will be suitably inputted to the receiving unit 7.

The waveguide 9 can transmit radio waves between the radar antenna 2 and the circulator 8. The waveguide 9 has a known configuration and therefore will not be described in detail here.

Because of the above configuration, with the radar device 1 in this embodiment, pulsed high-frequency signals generated by the magnetron 61 of the transmitting unit 6 are sent through the circulator 8 and the waveguide 9 to the radar antenna 2, and are sent as radar signals from the rotating radar antenna 2 to the surrounding area. Reflected waves (reflected signals) produced when the transmitted radar signals are reflected by an object are sent through the radar antenna 2, the waveguide 9, and the circulator 8 to the receiving unit 7. The receiving unit 7 subjects the reflected signals to signal processing to produce radar image data, and this radar image is displayed on the above-mentioned display device.

As discussed above, with the radar device 1 in this embodiment, the transmitting unit 6 is disposed on the right wall component 3R side of the housing 3 (just to the inside of the right wall component 3R), and the receiving unit 7 is disposed on the left wall component 3L side (just to the inside of the left wall component 3L) (see FIGS. 1 and 2). With this configuration, the transmitting unit 6 and the receiving unit 7, which are heat sources, are separated from one another and are located at places close to the wall components of the housing 3, so any heat generated by the transmitting unit 6 or the receiving unit 7 will readily be released to the outside of the housing 3. This means that heat is less likely to build up inside the housing 3.

Also, in the interior of the housing 3, the above-mentioned circulator 8, waveguide 9, and so forth are disposed between the transmitting unit 6 and the receiving unit 7. More precisely, the circulator 8 is disposed in the approximate center of the space bounded by the transmitting unit 6 and the receiving unit 7, and the waveguide 9 is disposed farther away from the opening 3a than the circulator 8. Furthermore, an isolator 12 that keeps the high-frequency signal generated by the transmitting unit 6 from being transmitted in the opposite direction from the direction in which it is supposed to propagate, and a filter 13 that removes any unnecessary signal components from the high-frequency signal generated by the transmitting unit 6 are disposed between the transmitting unit 6 and the receiving unit 7. Also, a limiter 14 that outputs input signals that are below a specific signal level just as they are, and outputs input signals that are at or over the specific signal level after first suppressing them as needed is disposed between the receiving unit 7 and the circulator 8.

Thus, with the radar device 1 in this embodiment, the transmitting unit 6 and the receiving unit 7, which are heat sources, are disposed near a pair of right and left wall components (the right wall component 3R and the left wall component 3L) had by the housing 3. Any parts that are needed to transmit radio waves from the transmitting unit 6 to the radar antenna 2 are disposed in series on the transmitting unit 6 side (the right side) of the space bounded by the transmitting unit 6 and the receiving unit 7. Meanwhile, any parts that are needed to transmit radio waves from the radar antenna 2 to the receiving unit 7 are disposed in series on the receiving unit 7 side (the left side) of the space bounded by the transmitting unit 6 and the receiving unit 7. This configuration not only improves the heat dissipation of the radar device 1, but also allows the various components that are needed for transmitting radio waves between the radar antenna 2 and the transmitting unit 6 or the receiving unit 7 to be disposed rationally (dividing them between transmitting and receiving), and affords a radar device 1 that is more compact. Also, because the circulator 8, the waveguide 9, then isolator 12, the filter 13, and the limiter 14 are thus disposed so that they are flanked by the transmitting unit 6 and the receiving unit 7, there is also an improvement in electromagnetic compatibility. In the following description, the circulator 8, the waveguide 9, then isolator 12, the filter 13, and the limiter 14 will sometimes be referred to collectively as "inter-unit parts."

In the interior of the housing 3, a flat frame 15 that is oriented substantially perpendicular to the plane formed by the transmitting unit 6 and the plane formed by the receiving unit 7 is disposed under the above-mentioned inter-unit parts 25. The transmitting unit 6 is fixed to the frame 15 via the transmitting unit frame 11. The receiving unit 7 is fixed to the frame 15 via the receiving unit frame 26 and stays 16 or the like. The inter-unit parts 25 are fixed to the frame 15 indirectly, via the transmitting unit 6 and the receiving unit 7. Thus, the transmitting unit 6, the receiving unit 7, and the inter-unit parts 25 are integrally attached to the frame 15. As shown in FIGS. 1 and 3, a certain amount of space is left between the inter-unit parts 25 and the frame 15.

A power supply unit 17 for supplying power to the various components, such as the drive motor 4, is disposed on the opposite side, sandwiching the inter-unit parts 25 and the frame 15. Specifically, this power supply unit 17 is disposed under the frame 15 and on the bottom face side of the housing 3 (just above the bottom face). Since the power supply unit 17, which is a heat source, is thus disposed near a different wall component (the bottom wall component 3B) from the wall component close to which the transmitting unit 6 or the receiving unit 7 is disposed (the right wall component 3R or the left wall component 3L) out of the wall components had by the housing 3, not only heat generated from the transmitting unit 6 and the receiving unit 7, but also heat generated from the power supply unit 17 can be easily released to the outside of the housing 3, so the cooling efficiency within the housing 3 is even better. Also, since the inter-unit parts 25 are separated from the power supply unit 17 by the frame 15, and in addition to this a certain amount of space is ensured between these, the inter-unit parts 25 tend not to be affected by heat. Therefore, if the inter-unit parts 25 include parts that are susceptible to heat, the service life of those parts can be extended. Also, in this embodiment, since the power supply unit 17, which is one of the heavier of the parts that make up the radar device 1, is disposed near the wall component on the bottom side of the housing 3 (the bottom wall component 3B), the center of gravity of the radar device 1 as a whole can be lowered, which allows the balance to be stabilized.

Figure 4:
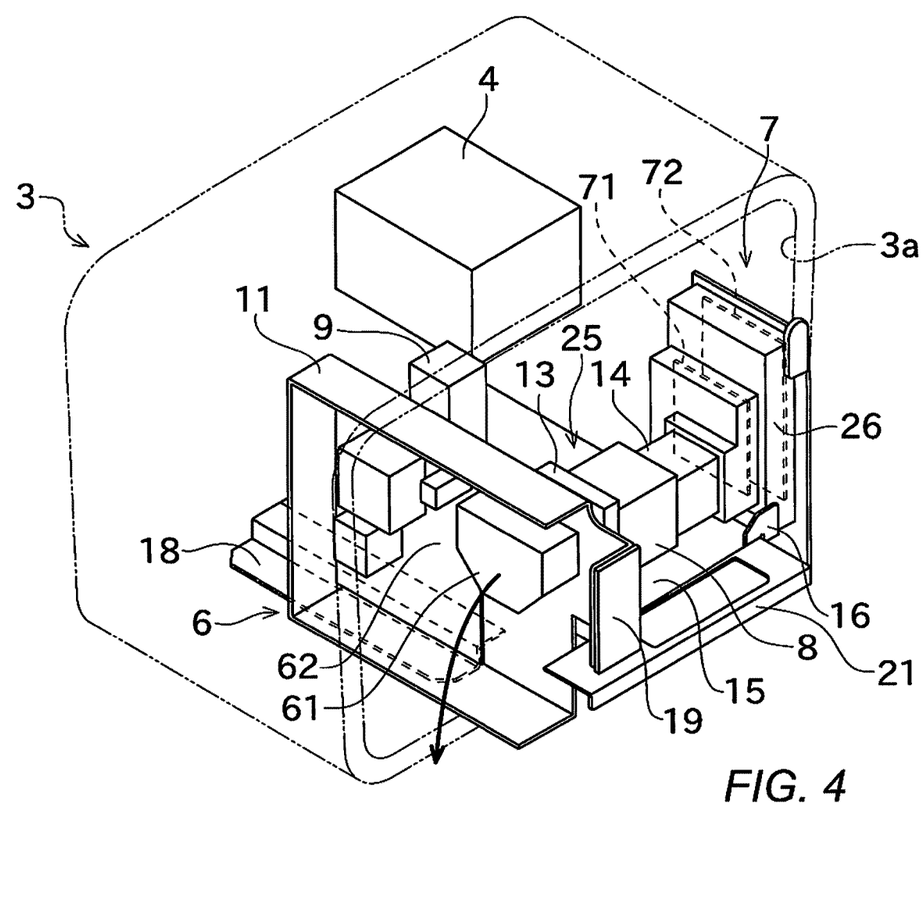
FIG. 4 is an oblique view of the state when the frame has been slid along the rails from the state in FIG. 3 and extracted to the outside of the housing.

The configuration for facilitating maintenance work will now be described through reference to FIGS. 3 and 4. The radar device 1 in this embodiment includes a sliding mechanism, and during maintenance of the parts in the housing 3, some of the components inside the housing 3 can be slid horizontally with respect to the other parts, so that they are pulled out of the housing 3 (extracted) and exposed. This sliding mechanism is made up of at least rails 18, the frame 15, and a handle 21.

The rails 18 in this embodiment are disposed as a pair in the left and right direction of the device. The rails 18 are each formed in an L shape in cross section, and extend parallel to the left wall component 3L and the right wall component 3R of the housing 3 (horizontally in the fore and aft direction of the device).

The frame 15 is configured so as to slide parallel to the plane formed by the transmitting unit 6 or the receiving unit 7, along the rails 18. The handle 21, which makes it easier for the user to pull out of the frame 15 by sliding it to the front of the device, is attached to the frame 15. In this embodiment, the user grasps the handle 21 and slides the frame 15 in the lower-right direction in FIG. 3, and as a result the transmitting unit 6, the receiving unit 7, and the inter-unit parts 25 integrally attached to the frame 15 also slide along with the frame 15 (see FIG. 4). Consequently, at least part of the transmitting unit 6, the receiving unit 7, and the inter-unit parts 25 can be exposed outside the housing 3. With the radar device 1 in this embodiment, since part of the frame 15 can thus be pulled out of the housing 3, maintenance of the transmitting unit 6, the receiving unit 7, and the inter-unit parts 25 supported on this frame 15 can be performed more efficiently.

As discussed above, in the transmitting unit 6, the magnetron 61 is disposed on the side closer to the opening 3a. Therefore, in a state in which the frame 15 has been slid along the rails 18 to expose at least part of the transmitting unit 6, the receiving unit 7, and the inter-unit parts 25 outside the housing 3, the entire magnetron 61 (at least almost all of it) is exposed. Consequently, the magnetron 61 can be removed from the frame 15 (the transmitting unit frame 11) in a state in which the frame 15 and so forth have been pulled out to the front of the device, as shown in FIG. 4. As a result, maintenance work (such as replacement work) on the magnetron 61, which is a part whose service life will be up after a certain amount of time, can be performed in fewer work steps.

A heat dissipation member 19, such as a heat dissipation sheet, is disposed on the front side in the sliding direction of the transmitting unit 6. The heat dissipation member 19 in this embodiment is attached to the end portion near the opening 3a of the housing 3, on the transmitting unit frame 11 that holds the transmitting unit 6. This heat dissipation member 19 has a certain amount of elasticity, and when the opening 3a of the housing 3 has been closed off with the cover, this member fits snugly against the inner face of the cover. Consequently, heat generated by the transmitting unit 6 can escape to the outside through the transmitting unit frame 11, the heat dissipation member 19, and the cover.

Also, since the heat dissipation member 19 is attached to the end portion of the transmitting unit frame 11 on the side closer to the opening 3a of the housing 3, when the cover is taken off the housing 3 and maintenance is performed on the transmitting unit 6 or the like, the deteriorated heat dissipation member 19 can also be easily replaced with a new one, so maintenance can be performed more efficiently.

As described above, the radar device 1 in this embodiment includes the radar antenna 2. The radar device 1 also includes the housing 3, the transmitting unit 6, and the receiving unit 7. The housing 3 has the right wall component 3R and the left wall component 3L, which are opposite each other. The transmitting unit 6 is attached on the right wall component 3R side in the internal space of the housing 3, and transmits radar signals through the radar antenna 2. The receiving unit 7 is attached on the right wall component 3R side in the internal space of the housing 3, is disposed opposite the transmitting unit 6, and receives the reflected waves of radar signals through the radar antenna 2.

Thus, since the transmitting unit 6 and the receiving unit 7, which generate heat, are disposed on the sides of (near to) the right wall component 3R and the left wall component 3L, heat generated by the transmitting unit 6 and the receiving unit 7 is easily released to the air outside the housing 3. This protects any parts in the housing 3 that are susceptible to heat. Also, the structure is simpler than a configuration in which a cooling fan is provided or a ventiduct allows air to flow through, and the manufacturing cost can be kept low.

A preferred embodiment of the present invention was described above, but the above configuration can be modified as follows, for example.

In the above embodiment, the power supply unit 17 is disposed near the bottom wall component 3B of the housing 3 (just above the bottom wall component 3B). This configuration is preferable from the standpoint of structurally stabilizing the center of gravity as a lower position for the radar device 1 as a whole, but it is not the only option. For example, the power supply unit 17 may instead be disposed on the rear wall component 3Z side of the housing 3.

The parts disposed between the transmitting unit 6 and the receiving unit 7 (the inter-unit parts 25) are not limited to what was discussed above, and can be modified to include other parts.

In the above embodiment, the rails 18 are configured to guide the frame 15 by a portion that is L-shaped in cross sectional view, but this is not the only option, and they can also be changed to I-shaped rails, for example.

In the above embodiment, the heat dissipation member 19 is attached to the transmitting unit 6 via the transmitting unit frame 11, but this is not the only option. For example, the heat dissipation member 19 can also be configured so as to be attached to the inner face of the cover.

In the above embodiment, the heat dissipation member 19 is disposed at the end portion of the transmitting unit 6 on the side closer to the opening 3a, but a heat dissipation member may instead be disposed on the end portion of the receiving unit 7 closer to the opening 3a.

In the above embodiment, the heat dissipation member 19 is configured as a heat dissipation sheet, but may instead be configured as heat dissipation grease, heat dissipation fins, or the like.

The positions of the transmitting unit 6 and the receiving unit 7 can also be switched left and right.

The opening 3a used to extract the frame 15, etc., or to access the interior of the housing 3 may be formed on the rear face side rather than on the front side of the housing 3. Also, the opening 3a can be formed on just one side of the housing 3. In this case, the transmitting unit 6 and the receiving unit 7 can be disposed on the wall component sides that are opposite each other in the fore and aft direction of the device.

The radar device of the present invention is not limited to being a marine radar device, and can also be applied as needed to other radar devices.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A radar device with a radar antenna, the radar device comprising:
    a housing having a first wall component and a second wall component that are opposite each other;
    a transmitting unit attached on the first wall component side in an internal space of the housing, and configured to transmit radar signal through the radar antenna;
    a receiving unit attached on the second wall component side in the internal space of the housing, disposed opposite the transmitting unit, and configured to receive reflected wave of the radar signal through the radar antenna; and
    a power supply unit,
    the housing further having a third wall component that is disposed in an orientation that is different from that of the first wall component and the second wall component, and
    the power supply unit being disposed on the third wall component side in the internal space of the housing.

2. The radar device according to claim 1, further comprising:
    a transmitting and receiving switch configured to selectively connect either the transmitting unit or the receiving unit to the radar antenna; and
    a waveguide configured to transmit radio wave between the radar antenna and either the transmitting unit or the receiving unit,
    the transmitting and receiving switch and the waveguide being disposed between the transmitting unit and the receiving unit.

3. The radar device according to claim 2, further comprising:
    a rail extending perpendicular to a direction in which the first wall component and the second wall component are opposite each other; and
    a frame slidable along the rail,
    the transmitting unit, the receiving unit, and a part disposed between the transmitting unit and the receiving unit being supported by the frame, and being extractable through an opening formed in the housing by sliding along the rail integrally with the frame.

4. The radar device according to claim 3, wherein
the receiving unit includes
    a receiving board that is disposed along one of the first wall component and the second wall component of the housing, and
    a signal processing board that is disposed parallel to the receiving board.

5. The radar device according to claim 2, wherein
the receiving unit includes
    a receiving board that is disposed along one of the first wall component and the second wall component of the housing, and
    a signal processing board that is disposed parallel to the receiving board.

6. The radar device according to claim 1, wherein
the third wall component is a wall component on a bottom of the housing.

7. The radar device according to claim 6, wherein
the receiving unit includes
    a receiving board that is disposed along one of the first wall component and the second wall component of the housing, and
    a signal processing board that is disposed parallel to the receiving board.

8. The radar device according to claim 1, further comprising:
    a rail extending perpendicular to a direction in which the first wall component and the second wall component are opposite each other; and
    a frame slidable along the rail,
    the transmitting unit, the receiving unit, and a part disposed between the transmitting unit and the receiving unit being supported by the frame, and being extractable through an opening formed in the housing by sliding along the rail integrally with the frame.

9. The radar device according to claim 8, wherein
at least part of the transmitting unit is removable from the frame in a state in which the part of the transmitting unit is extracted outside the housing after sliding along the rail integrally with the frame.

10. The radar device according to claim 8, further comprising
    a heat dissipation member attached to at least one of the transmitting unit and the receiving unit,
    the heat dissipation member being disposed at an end portion of the transmitting unit or the receiving unit on a side closer to the opening.

11. The radar device according to claim 8, wherein
the receiving unit includes
    a receiving board that is disposed along one of the first wall component and the second wall component of the housing, and
    a signal processing board that is disposed parallel to the receiving board.

12. The radar device according to claim 1, wherein
the receiving unit includes
    a receiving board that is disposed along one of the first wall component and the second wall component of the housing, and
    a signal processing board that is disposed parallel to the receiving board.

13. A radar device with a radar antenna, the radar device comprising:
- a housing having a first wall component and a second wall component that are opposite each other;
- a transmitting unit attached on the first wall component side in an internal space of the housing, and configured to transmit radar signal through the radar antenna;
- a receiving unit attached on the second wall component side in the internal space of the housing, disposed opposite the transmitting unit, and configured to receive reflected wave of the radar signal through the radar antenna;
- a rail extending perpendicular to a direction in which the first wall component and the second wall component are opposite each other; and
- a frame slidable along the rail,
- the transmitting unit, the receiving unit, and a part disposed between the transmitting unit and the receiving unit being supported by the frame, and being extractable through an opening formed in the housing by sliding along the rail integrally with the frame.

14. The radar device according to claim 13, wherein
- at least part of the transmitting unit is removable from the frame in a state in which the part of the transmitting unit is extracted outside the housing after sliding along the rail integrally with the frame.

15. The radar device according to claim 13, further comprising
- a heat dissipation member attached to at least one of the transmitting unit and the receiving unit,
- the heat dissipation member being disposed at an end portion of the transmitting unit or the receiving unit on a side closer to the opening.

16. The radar device according to claim 13, wherein
- the receiving unit includes
  - a receiving board that is disposed along one of the first wall component and the second wall component of the housing, and
  - a signal processing board that is disposed parallel to the receiving board.

* * * * *